United States Patent
Takahashi

(10) Patent No.: US 7,463,008 B2
(45) Date of Patent: Dec. 9, 2008

(54) POWER SUPPLY APPARATUS WITH TRANSISTOR CONTROL FOR CONSTANT CURRENT BETWEEN SERIES-CONNECTED BATTERY BLOCKS

(75) Inventor: Tsukasa Takahashi, Fukushima (JP)

(73) Assignee: Sony Corporation (JP)

( * ) Notice: Subject to any disclaimer, the term of this patent is extended or adjusted under 35 U.S.C. 154(b) by 63 days.

(21) Appl. No.: 11/445,339

(22) Filed: Jun. 2, 2006

(65) Prior Publication Data

US 2006/0284597 A1    Dec. 21, 2006

(30) Foreign Application Priority Data

Jun. 9, 2005 (JP) ............................ P2005-169976

(51) Int. Cl.
*H01M 10/46* (2006.01)

(52) U.S. Cl. ..................................................... 320/118

(58) Field of Classification Search .................. 320/106, 320/110, 112, 116, 118, 119, 122, 132, 134, 320/136
See application file for complete search history.

(56) References Cited

U.S. PATENT DOCUMENTS 5,412,305 A * 5/1995 Jeanneret ...................... 320/119
6,291,972 B1 * 9/2001 Zhang .......................... 320/118
6,462,511 B1 * 10/2002 Kwok .......................... 320/119

FOREIGN PATENT DOCUMENTS

JP          10-304586          11/1998

* cited by examiner

*Primary Examiner*—Edward Tso
(74) *Attorney, Agent, or Firm*—Rader Fishman & Grauer PLLC; Ronald P. Kananen

(57) ABSTRACT

A power supply device having a plurality of series-connected-battery blocks which are connected in parallel and in which two or more secondary cells capable of charging and discharging are connected in series, includes a constant-current control circuit provided for each of the series-connected-battery blocks.

5 Claims, 1 Drawing Sheet

POWER SUPPLY APPARATUS WITH TRANSISTOR CONTROL FOR CONSTANT CURRENT BETWEEN SERIES-CONNECTED BATTERY BLOCKS

CROSS REFERENCES TO RELATED APPLICATIONS

The present invention contains subject matter related to Japanese Patent Application JP 2005-166976 filed in the Japanese Patent Office on Jun. 9, 2005, the entire contents of which being incorporated herein by reference.

BACKGROUND OF THE INVENTION

1. Field of the Invention:

The present invention relates to a power supply device of comparatively large capacity that includes a plurality of series-connected-battery blocks which are connected in parallel and in each of which two or more secondary cells capable of charging and discharging are connected in series.

2. Description of the Related Art:

There has been proposed a power supply device of comparatively large capacity that includes a plurality of series-connected-battery blocks which are connected in parallel and in each of which two or more secondary cells capable of charging and discharging are connected in series. In such power supply device, when connecting a plurality of series-connected-battery blocks in parallel, in each of which two or more secondary cells capable of charging and discharging are connected in series, a rush current flows into a series-connected-battery block of a low potential difference from a series-connected-battery block of a high potential difference.

Since the rush current is limited only by an internal impedance of the series-connected-battery blocks, there is a possibility of damaging the series-connected-battery block of a low potential difference.

FIG. 1 shows related art in which a plurality of series-connected-battery blocks are connected in parallel through diodes. In FIG. 1, each of reference numerals 1, 2 and 3 denotes a series-connected-battery block in which two or more, for example four, secondary cells capable of charging and discharging, lithium-ion secondary cells for example, are connected in series.

A positive electrode of the series-connected-battery block 1 is connected to a cathode of a diode 1a and is connected to an anode of a diode 1b; a positive electrode of the series-connected-battery block 2 is connected to a cathode of a diode 2a and is connected to an anode of a diode 2b; and a positive electrode of a series-connected-battery block 3 is connected to a cathode of a diode 3a and is connected to an anode of a diode 3b.

Each anode of the diodes 1a, 2a and 3a is connected to a charge positive terminal 4 of the power supply device, respectively. Specifically, when each anode of the diodes 1a, 2a and 3a is connected in parallel to the charge positive terminal 4, the diodes 1a, 2a and 3a function as those for preventing reverse current, and so no rush current flows when connected in parallel and each of the series-connected-battery blocks 1, 2 and 3 is prevented from being damaged.

Further, each cathode of the diodes 1b, 2b and 3b is connected to a discharge positive terminal 5 of the power supply device, respectively. Specifically, when each cathode of the diodes 1b, 2b and 3b is connected in parallel to the discharge positive terminal 5, the diodes 1b, 2b and 3b function as those for preventing reverse current, and so no rush current flows when connected in parallel and each of the series-connected-battery blocks 1, 2 and 3 is prevented from being damaged.

Further, each negative electrode of the series-connected-battery blocks 1, 2 and 3 is connected to a negative terminal 6 of the power supply device.

In such power supply device of the past as shown in FIG. 1, when charging, a charge current flows into the series-connected-battery blocks 1, 2 and 3 through the diodes 1a, 2a and 3a to charge; and when discharging, the series-connected-battery blocks 1, 2 and 3 are connected to a load through the diodes 1b, 2b and 3b to discharge.

Further, in the related art of FIG. 1, when the series-connected-battery blocks 1, 2 and 3 with potential differences are connected in parallel, current does not flow among the series-connected-battery blocks 1, 2 and 3 due to the diodes 1a, 2a, 3a, and 1b, 2b, 3b. Therefore, even if the series-connected-battery blocks 1, 2 and 3 with potential differences are connected in parallel, each of series-connected-battery blocks 1, 2 and 3 is prevented from being damaged, because no rush current flows.

Japanese Published Patent Application No. H10-304586 discloses a charging device for secondary batteries, including a plurality of series-circuits of the secondary batteries, which are connected in parallel and in each of which two or more secondary cells are connected in series. In this patent literature, there is no description of preventing the rush current when respective series-connected secondary batteries are connected in parallel.

SUMMARY OF THE INVENTION

When discharge current flows into a load from this power supply device of the related art, there is caused power loss of $$I \times Vf$$

where I is a current that flows into the diodes 1b, 2b and 3b respectively, and Vf is a threshold voltage of each of the diodes 1b, 2b and 3b.

There is an inconvenience that if the current from the power supply device increases, the power loss due to the diodes 1b, 2b and 3b becomes so large that it may not be disregarded.

Further, each of the series-connected-battery blocks 1, 2 and 3 is separated by the diodes 1a, 2a, 3a and 1b, 2b, 3b, and therefore dispersion regarding capacity balance at the time of parallel connection may not be improved and remains as it is. When the charge and discharge are performed in the state in which the capacity balance among respective series-connected-battery blocks 1, 2 and 3 is not maintained, there is such inconvenience that discharge time becomes short, or the like. That is because at the time of the discharge the discharge time depends upon a series-connected-battery block with small capacity, in the case where there is an over-discharge protection circuit.

In view of the above, it is desirable not to be damaged by rush current, and it is desirable to improve power loss; to reduce capacity imbalance among respective series-connected-battery blocks; and to improve discharge time, when a plurality of series-connected-battery blocks are connected in parallel.

A power supply device according to an embodiment of the present invention includes a plurality of series-connected-battery blocks which are connected in parallel and in each of which two or more secondary cells capable of charging and discharging are connected in series, wherein a constant-current control circuit is provided for each of the series-connected-battery blocks.

In the power supply device according to an embodiment of the present invention, the constant-current control circuit is provided for each of the series-connected-battery blocks. When the series-connected-battery blocks with potential differences are connected in parallel, rush current may flow into the series-connected-battery block with a low potential difference from the series-connected-battery block with a high potential difference. However, since each constant-current control circuit prevents a fixed current or more from flowing into each of the series-connected-battery blocks, the series-connected-battery block of a low potential difference is prevented from being damaged.

According to an embodiment of this invention, since the constant-current control circuit allows a constant current flowing into the series-connected-battery block with a low potential difference from the series-connected-battery block with a high potential difference, the difference in potential among the series-connected-battery blocks is gradually reduced. Consequently, the current among the series-connected-battery blocks stops flowing and the potential difference among the series-connected-battery blocks disappears.

That is, according to an embodiment of the present invention, capacity balance among respective series-connected-battery blocks is improved, and so discharge time is extended and safety is improved by improving the capacity balance among the series-connected-battery blocks.

Further, according to an embodiment of this invention, power loss at the time of discharge can be improved, with a FET (Field-effect Transistor) for example, which functions as a current control element constituting the constant-current control circuit, being "ON" state at the time of the discharge.

DESCRIPTION OF THE PREFERRED EMBODIMENTS

Figure 1:
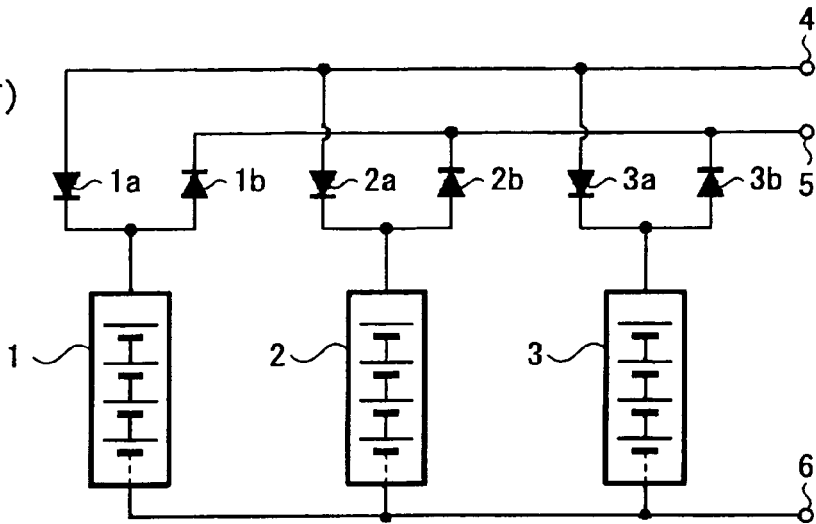
FIG. 1 is a constitutional diagram showing an example of a power supply device of related art.
Figure 2:
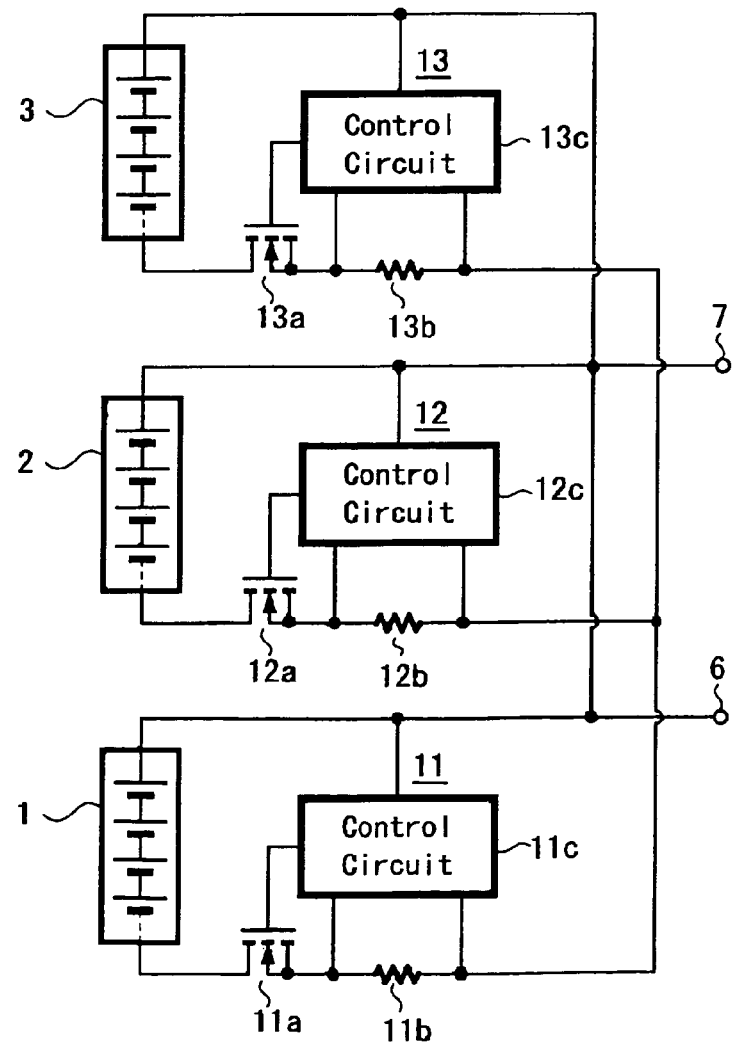
FIG. 2 is a constitutional diagram showing a power supply device according to an embodiment of the present invention.

Hereinafter, an embodiment of the power supply device of the present invention is explained with reference to FIG. 2. In FIG. 2, portions corresponding to those in FIG. 1 are given the same numerals and shown.

In FIG. 2, reference numerals 1, 2 and 3 each denote a series-connected-battery block in which two or more, for example four, secondary cells capable of charging and discharging, for example lithium-ion batteries, are connected in series.

In this embodiment, these three series-connected-battery blocks 1, 2 and 3 are connected in parallel, and each positive electrode of the series-connected-battery blocks 1, 2 and 3 is connected to a positive terminal 7 of the power supply device, respectively.

In this embodiment, each negative electrode of the series-connected-battery blocks 1, 2 and 3 is connected to each drain of n-type FETs 11a, 12a and 13a functioning as current control elements that constitute constant-current control circuits 11, 12 and 13, respectively. Further, each source of the FETs 11a, 12a and 13a is connected to a negative terminal 6 of the power supply device through each of current detecting resistors 11b, 12b and 13b. Each of control circuits 11c, 12c and 13c of the constant-current control circuits 11, 12 and 13 detects current that flows through each of the resistors 11b, 12b and 13b. Then, a voltage supplied to each gate of the FETs 11a, 12a and 13a is controlled in accordance with that current, and each current that flows into the resistors 11b, 12b and 13b is controlled to be a fixed value.

Further, in this embodiment, a load is connected between the positive terminal 7 and the negative terminal 6, and when current is supplied to the load, the FETs 11a, 12a and 13a are caused to be the ON state by the control circuits 11c, 12c and 13c.

According to this embodiment, the constant-current control circuits 11, 12 and 13 are provided for the series-connected-battery blocks 1, 2 and 3, respectively. When the series-connected-battery blocks with potential differences are connected in parallel, rush current may flow into the series-connected-battery block with a low potential difference, for example, into the series-connected-battery block 2, from the series-connected-battery block with a high potential difference, for example, from the series-connected-battery block 1. However, since the constant-current control circuits 11, 12 and 13 prevent a fixed current or more from flowing into each of the series-connected-battery blocks 1, 2 and 3, the series-connected-battery block of a low potential difference, for example, the series-connected-battery block 2, is prevented from being damaged.

In this embodiment, since the constant-current control circuits 11, 12 and 13 allow a constant current flowing into the series-connected-battery block with a low potential difference, for example, the series-connected-battery block 2 from the series-connected-battery block with a high potential difference, for example, the series-connected-battery block 1, the difference in potential among the series-connected-battery blocks 1, 2 and 3 is gradually reduced. Consequently, the current among the series-connected-battery blocks 1, 2 and 3 stops flowing and the potential difference among the series-connected-battery blocks 1, 2 and 3 disappears.

That is, according to this embodiment, capacity balance among respective series-connected-battery blocks 1, 2 and 3 is improved, and so discharge time is extended and safety is improved with the capacity balance among the series-connected-battery blocks 1, 2 and 3 being improved.

Further, in this embodiment, power loss at the time of discharge can be improved, with FETs (Field-effect Transistor) 11a, 12a and 13a, for example, functioning as current control elements constituting the constant-current control circuits 11, 12 and 13, being "ON" state at the time of the discharge.

Note that, in the embodiment mentioned above, though four secondary cells are connected in series in each of the series-connected-battery blocks 1, 2 and 3, the number of cells may be altered according to need. Furthermore, the number of series-connected-battery blocks that are connected in parallel may be altered as need arises.

It should be understood by those skilled in the art that various modifications, combinations, sub-combinations and alterations may occur depending on design requirements and other factors insofar as they are within the scope of the appended claims or the equivalents thereof.

What is claimed is:

1. A power supply device, comprising:
   a plurality of series-connected-battery blocks which are connected in parallel and in each of which two or more secondary cells capable of charging and discharging are connected in series,
   a constant-current control circuit provided for each of said series-connected-battery blocks sensing current in circuit with an associated one of said plurality of series-connected-battery blocks to provide a signal for a gate of a transistor in circuit with said associated one of said plurality of series-connected-battery blocks preventing rush current to said associated one of said plurality of series-connected-battery blocks.

2. A power supply device according to claim 1, wherein said secondary cell is a lithium-ion secondary battery.

3. A power supply device according to claim 1 or 2, wherein said transistor is a current control element of said constant-current control circuit and is a field-effect transistor having its gate in circuit with said control circuit, one of its source and drain electrodes connected to said associated one of said plurality of series-connected-battery blocks, and its source connected to a current detecting resistor of said control circuit; and when discharging, said constant-current control circuit causes said field-effect transistor to be ON-state and controls a gate voltage of said field-effect transistor in accordance with a voltage between terminals of a current detecting resistor that detects a current flowing through said series-connected-battery block, controlling the current flowing through said resistor to be a fixed value.

4. A power supply device, comprising:

a plurality of series-connected-battery blocks connected in parallel and in each of which two or more secondary cells capable of charging and discharging are connected in series, and a constant-current control circuit provided for each of said series-connected-battery blocks, for maintaining a constant current flowing into a battery block having a low potential difference from a battery block with a high potential difference, said control circuit including a current sensing resistor in parallel with said control circuit to provide a voltage signal from said control circuit indicative of said current flowing in an associated battery block, and a field effect transistor having its gate connected to said voltage signal from said control circuit for sensing said voltage signal, said field effect transistor and said current sensing resistor connected in series with said associated battery block, so that when discharging, said constant-current control circuit causes said field-effect transistor to be in an ON-state and controls a gate voltage of said field-effect transistor in accordance with a voltage between terminals of said current detecting resistor that detects a current flowing through said series-connected-battery block, controlling the current flowing through said resistor to be a fixed value.

5. power supply device according to claim 4, wherein said secondary cell is a lithium-ion secondary battery.

* * * * *